Oct. 25, 1932.   J. LEDWINKA   1,883,991
PRESSED METAL VEHICLE BODY
Filed March 16, 1927   10 Sheets-Sheet 1
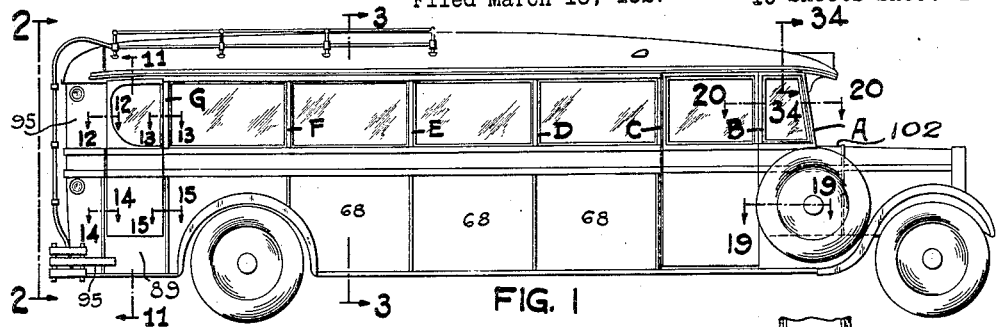
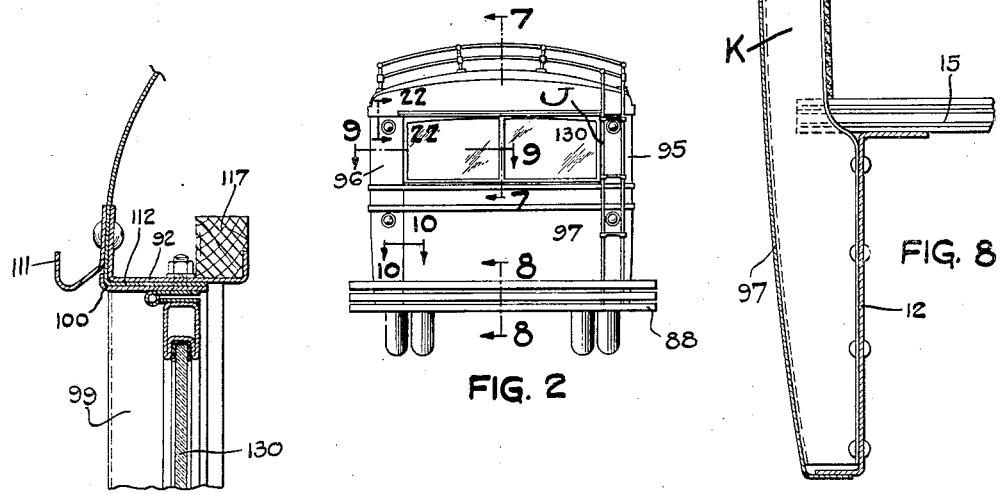
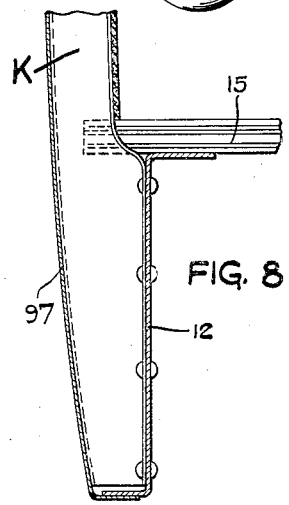
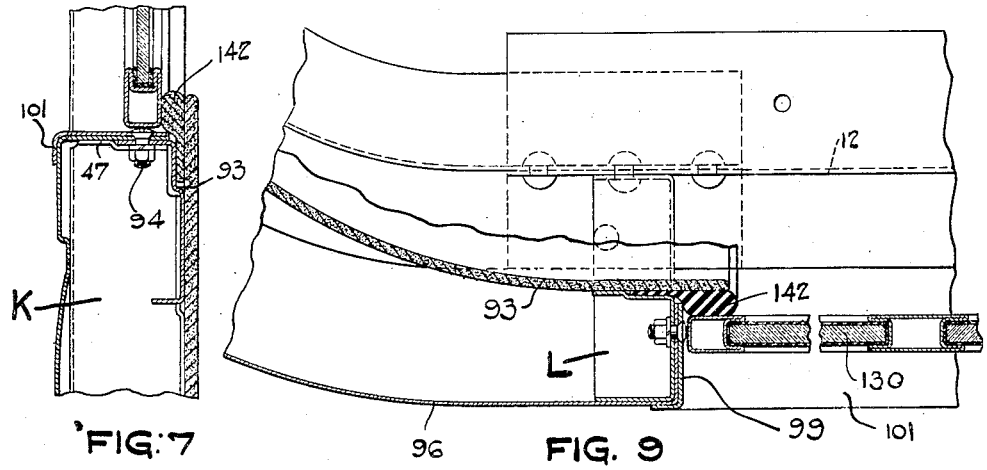
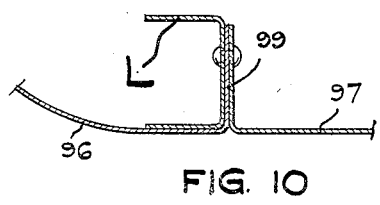
INVENTOR.
JOSEPH LEDWINKA
BY
John P. Farber
ATTORNEY.

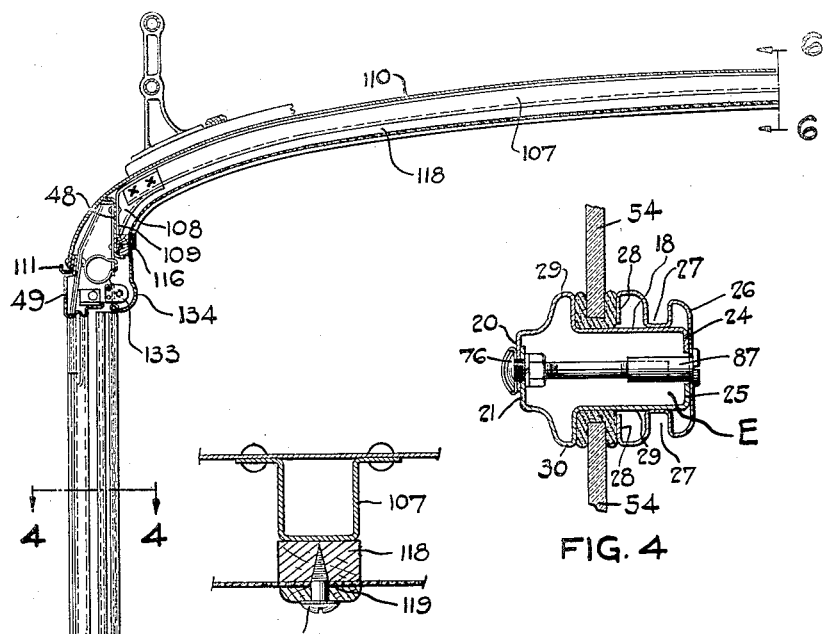
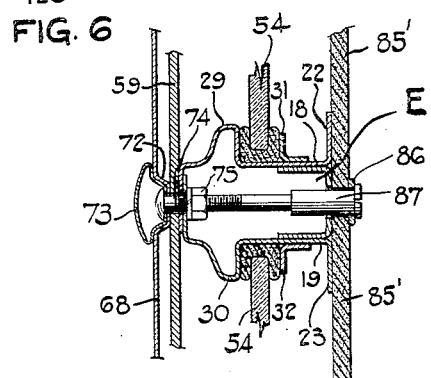
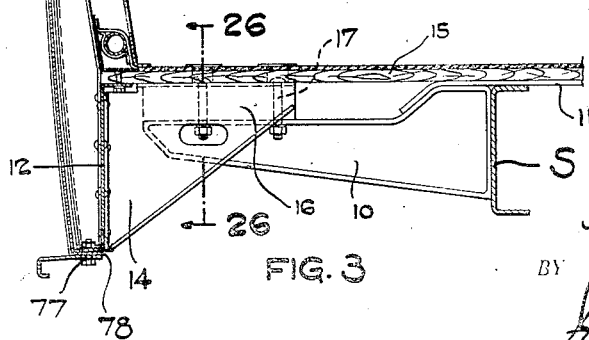

Oct. 25, 1932.    J. LEDWINKA    1,883,991
PRESSED METAL VEHICLE BODY
Filed March 16, 1927     10 Sheets-Sheet 3
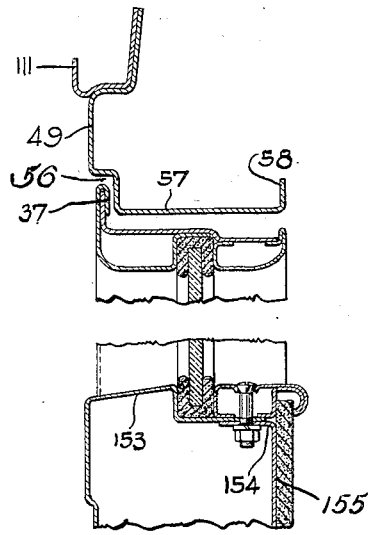
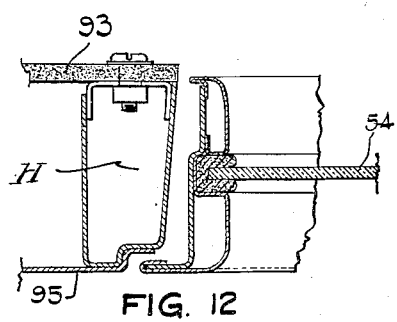
FIG. 12
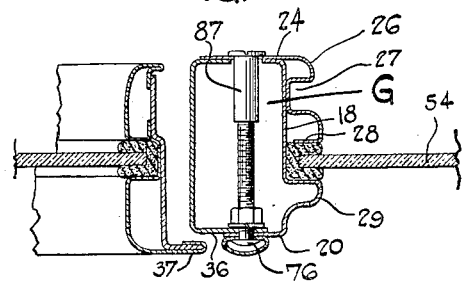
FIG. 13
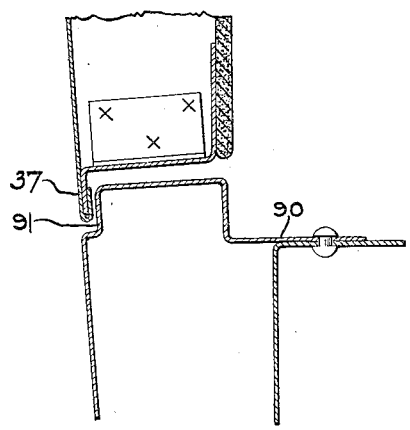
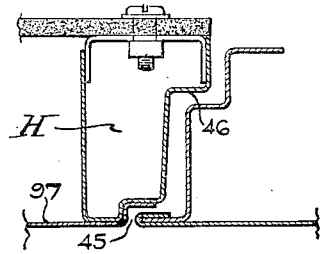
FIG. 14
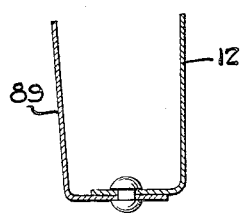
FIG. 11
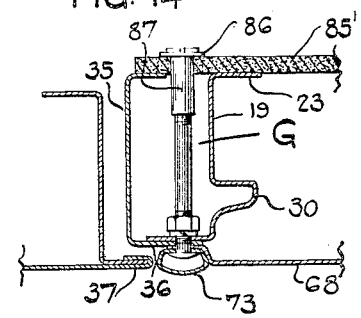
FIG. 15
INVENTOR.
JOSEPH LEDWINKA
BY
John P. Barbey
ATTORNEY.

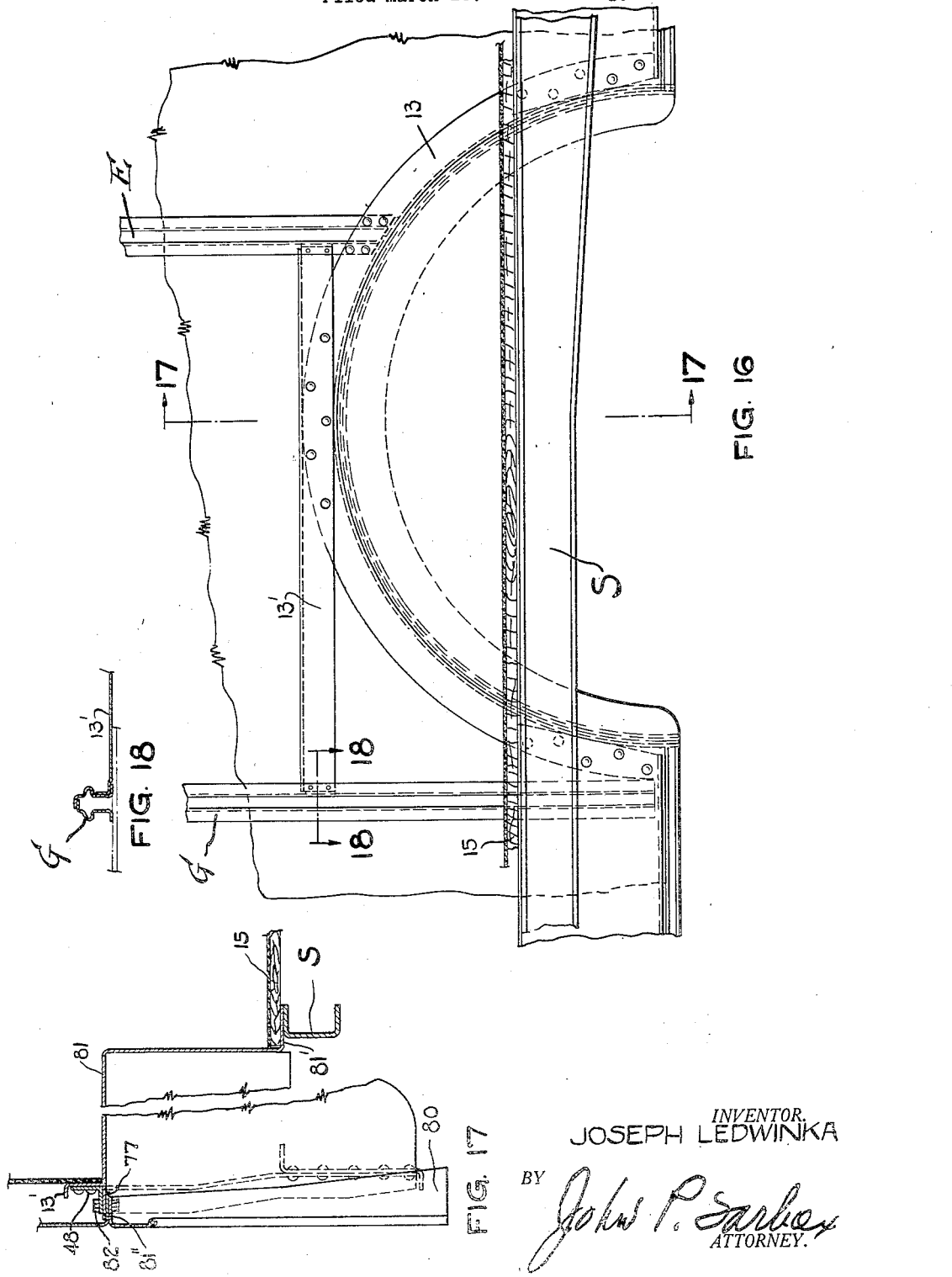

Oct. 25, 1932.  J. LEDWINKA  1,883,991
PRESSED METAL VEHICLE BODY
Filed March 16, 1927   10 Sheets-Sheet 5
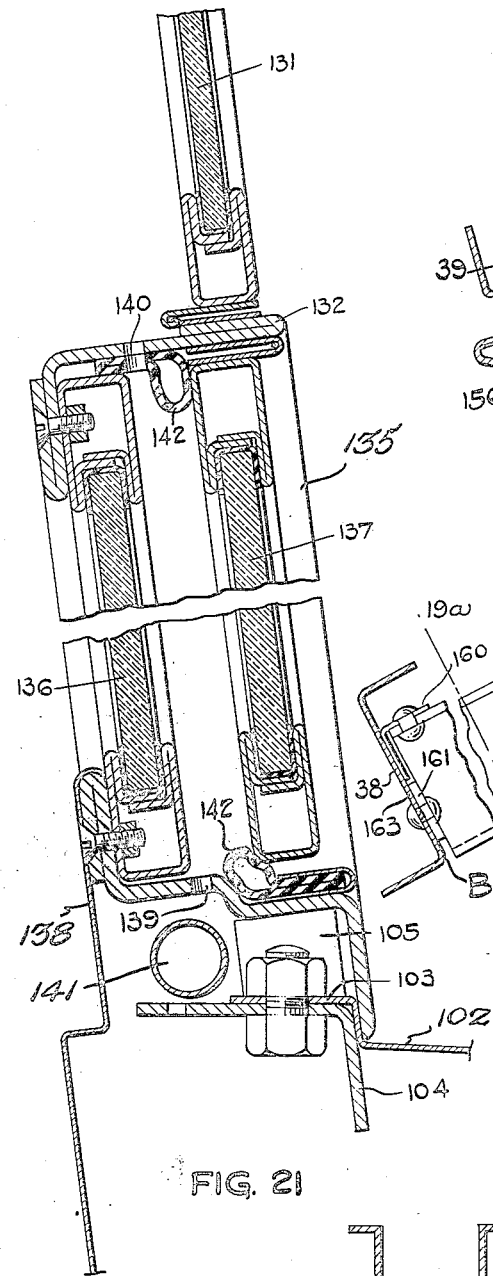
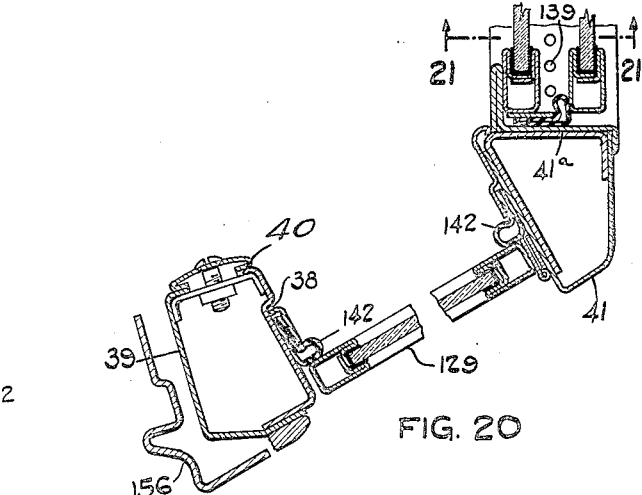
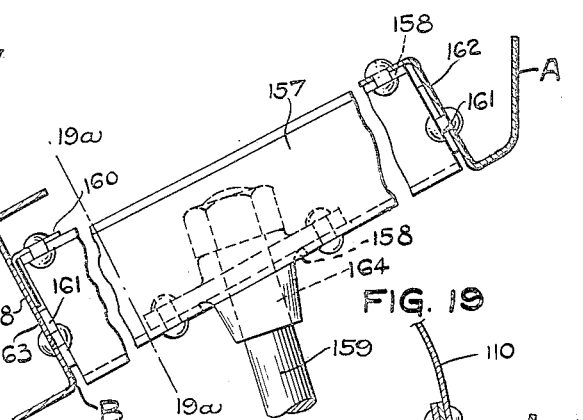
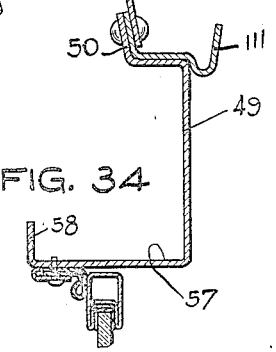
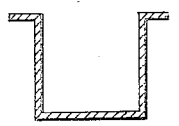
INVENTOR.
JOSEPH LEDWINKA
BY
ATTORNEY.

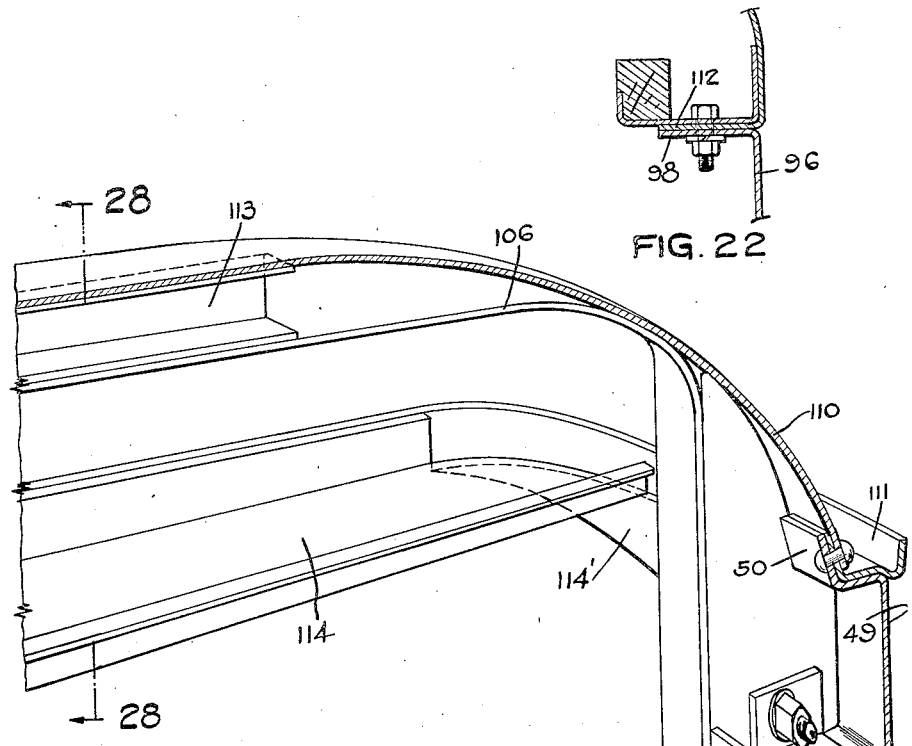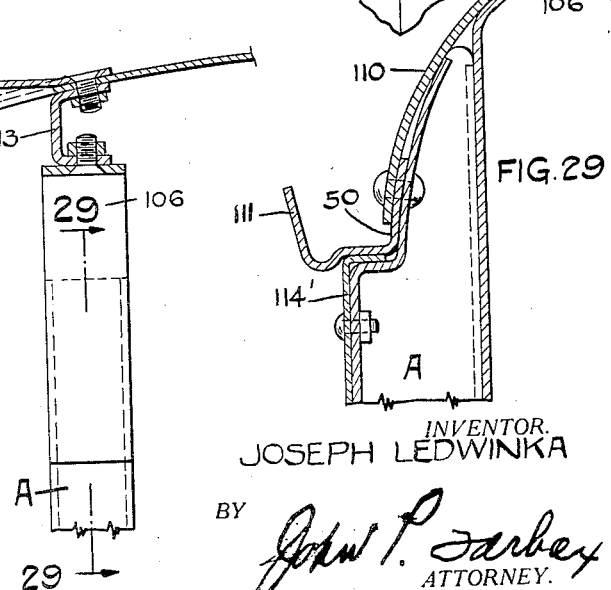

INVENTOR.
JOSEPH LEDWINKA

Oct. 25, 1932.  J. LEDWINKA  1,883,991
PRESSED METAL VEHICLE BODY
Filed March 16, 1927    10 Sheets-Sheet 8

INVENTOR.
JOSEPH LEDWINKA
BY
*John P. Sarbey*
ATTORNEY

Oct. 25, 1932.  J. LEDWINKA  1,883,991
PRESSED METAL VEHICLE BODY
Filed March 16, 1927   10 Sheets-Sheet 9

INVENTOR.
JOSEPH LEDWINKA
BY
*John P. Barber*
ATTORNEY.

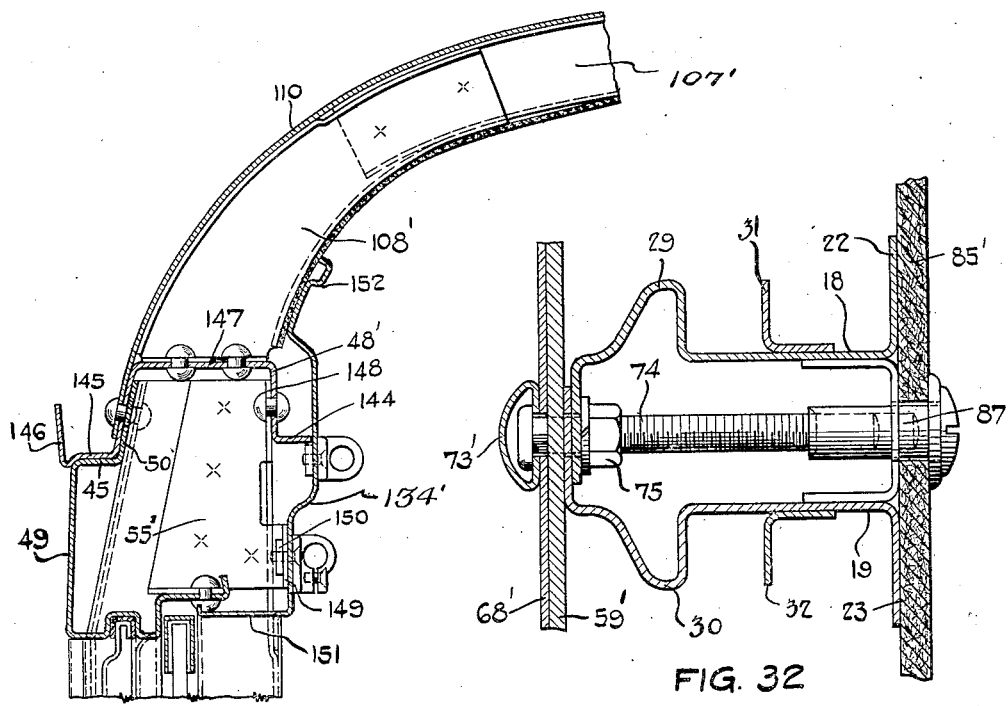
FIG. 30
FIG. 32
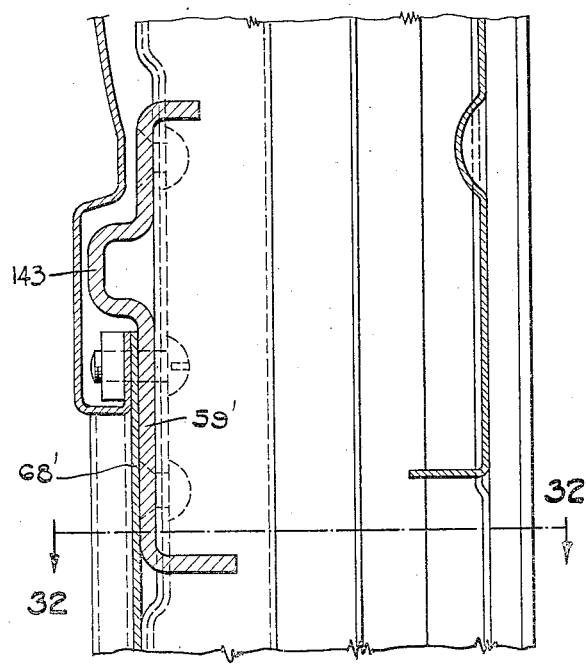
FIG. 31
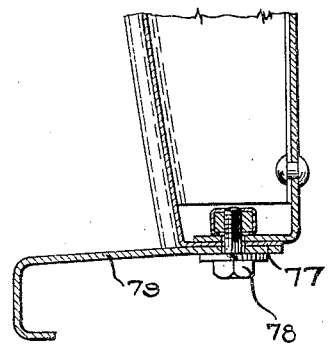
FIG. 33
INVENTOR.
JOSEPH LEDWINKA Patented Oct. 25, 1932

1,883,991

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed March 16, 1927. Serial No. 175,851.

The invention relates to pressed metal vehicle bodies and, more particularly, to bodies of this class adapted for use on the bus type of motor vehicle.

It is a main object of the invention to provide a body of this class which is relatively light in weight yet strong and durable; which is economical of manufacture in mass production and hence capable of being produced at relatively low cost to the purchaser; which is characterized by roominess and easy riding qualities, and by pleasing interior and exterior appearance; which affords a maximum of range of vision to the occupants thereof; and which can be readily repaired in case of damage to the outside paneling.

These objects are attained by constructing the body parts in large part of those angle, channel and curvilinear sections to the formation of which sheet metal, such as sheet steel, lends itself so readily, which sections impart strength and rigidity to the structure even though the metal from which they are formed is of relatively light gauge. Thus is attained lightness, combined with rigidity, strength and durability. Economy of manufacture is attained by standardizing of parts and the identical formation to a large extent of the serially arranged roof and side panel sections and the roof and side frame members, such as the cross members of the roof and the body side posts. This reduces the number of parts of the same shape and dimensions entering into the body construction and hence, lowers the die cost and reduces the number of separate manufacturing operations and also the floor space required for manufacturing operations. This construction of parts of standard form and dimension also tends toward economy of manufacture of bodies of this class of different lengths and widths, since obviously the side can be longitudinally extended by simply adding additional posts and panels and similarly for different widths of bodies the side sections may remain the same.

Roominess and easy riding qualities are attained by reason of the relatively thin frame members of steel whereby the thickness of the walls of the body are reduced to a minimum and thus for a given width of body the available space for seats and aisle is a maximum, thus contributing to the comfort of the passengers. The riding qualities are further enhanced by the low mounting of the body on the vehicle chassis and consequent low center of gravity of the same.

Pleasing exterior appearance is attained mainly by those flowing lines to the formation of which pressed metal lends itself, and further to the fine finish that can be given the all metal construction by the baked enamel finish. Pleasing interior is furnished largely, of course, by the choice of trim and upholstery, but the improved construction whereby heating elements and other adjunctive parts are concealed to a large extent by metal stampings, etc., also adds considerably to the attainment of this result.

Maximum range of vision is attained by the provision of window openings of generous proportions at sides, back and front which are spaced in the main only by the relatively thin roof supporting posts, the opaque projection of these posts being increased only at the door openings and there only by the very narrow pressed metal door rails. The all metal posts and door rails permit the reduction of the opaque projection of the elements between the window openings to a veritable minimum.

Ready repair in case of injury to the side panels is attained by the manner in which these panels are removably secured in place, so that one can be readily taken out and replaced by another.

Further objects of the invention are the provision of highly efficient means for ventilating the interior of the bus and the provision of means for keeping the windshield clear of ice in cold weather operation.

Other and further objects and advantages will appear from the following detailed description of the invention.

In the accompanying drawings:—

Figs. 1 and 2 are, respectively, a side elevation, and a rear elevation of a vehicle embodying the invention.

Fig. 3 is a view in transverse section taken substantially on the line 3—3 of Fig. 1.

Figs. 4, 5 and 6 are detail sectional views taken, respectively, on the lines 4—4, 5—5 and 6—6 of Fig. 3.

Figs. 7, 8, 9 and 10 are detail sectional views taken, respectively, on the lines 7—7, 8—8, 9—9 and 10—10 of Fig. 2.

Figs. 11, 12, 13, 14 and 15 are detail sectional views taken, respectively, on the lines 11—11, 12—12, 13—13, 14—14 and 15—15 of Fig. 1.

Fig. 16 is a fragmentary view of the side of the body in the wheel housing region, as seen from the inside.

Figs. 17 and 18 are detail sectional views taken, respectively, on the lines 17—17 and 18—18 of Fig. 16.

Figs. 19 and 20 are detail sectional views taken, respectively, on the lines 19—19 and 20—20 of Fig. 1.

Fig. 19a is a detail sectional view on the line 19a—19a of Fig. 19.

Fig. 21 is an enlarged detail sectional view taken on a longitudinal vertical plane through the windshield structure.

Fig. 22 is a detail sectional view taken on the line 22—22 of Fig. 2 showing the joint between the roof and rear panel.

Figure 23:
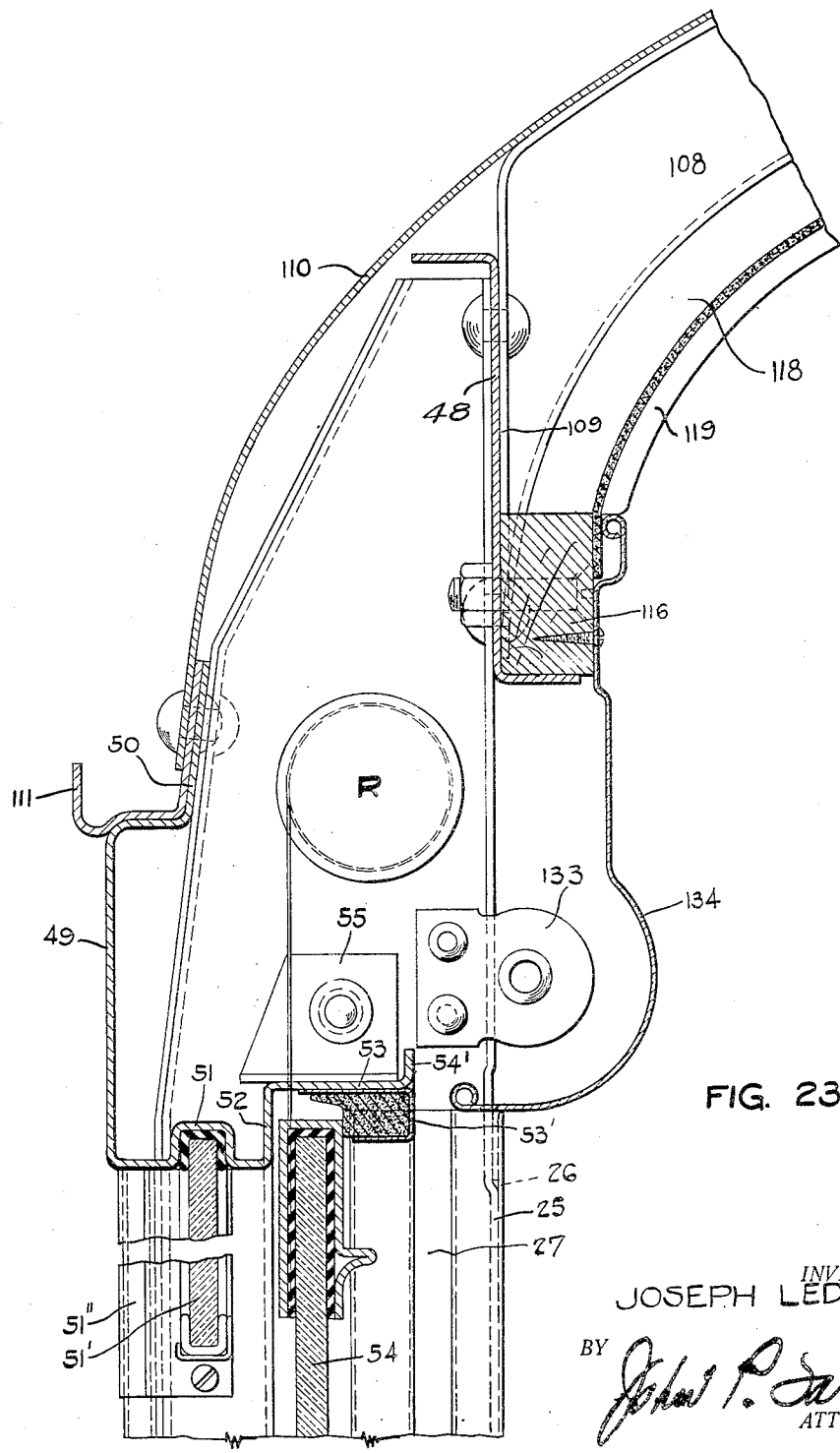
Figure 24:
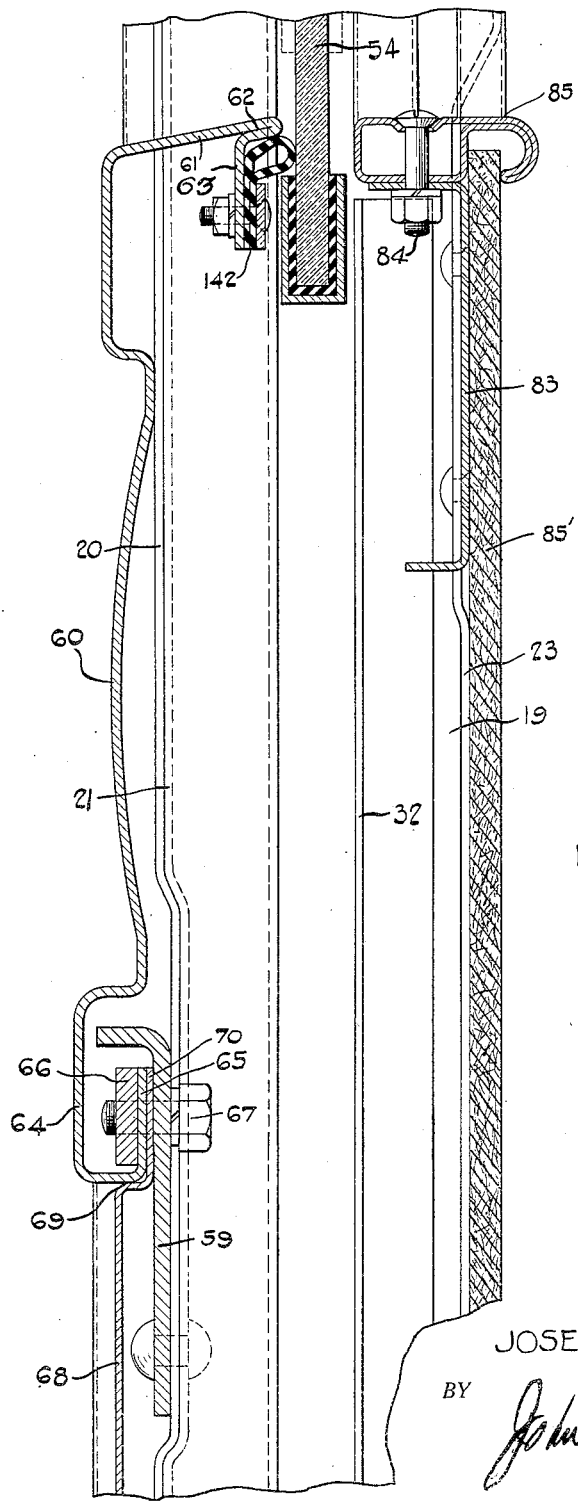
Figure 25:
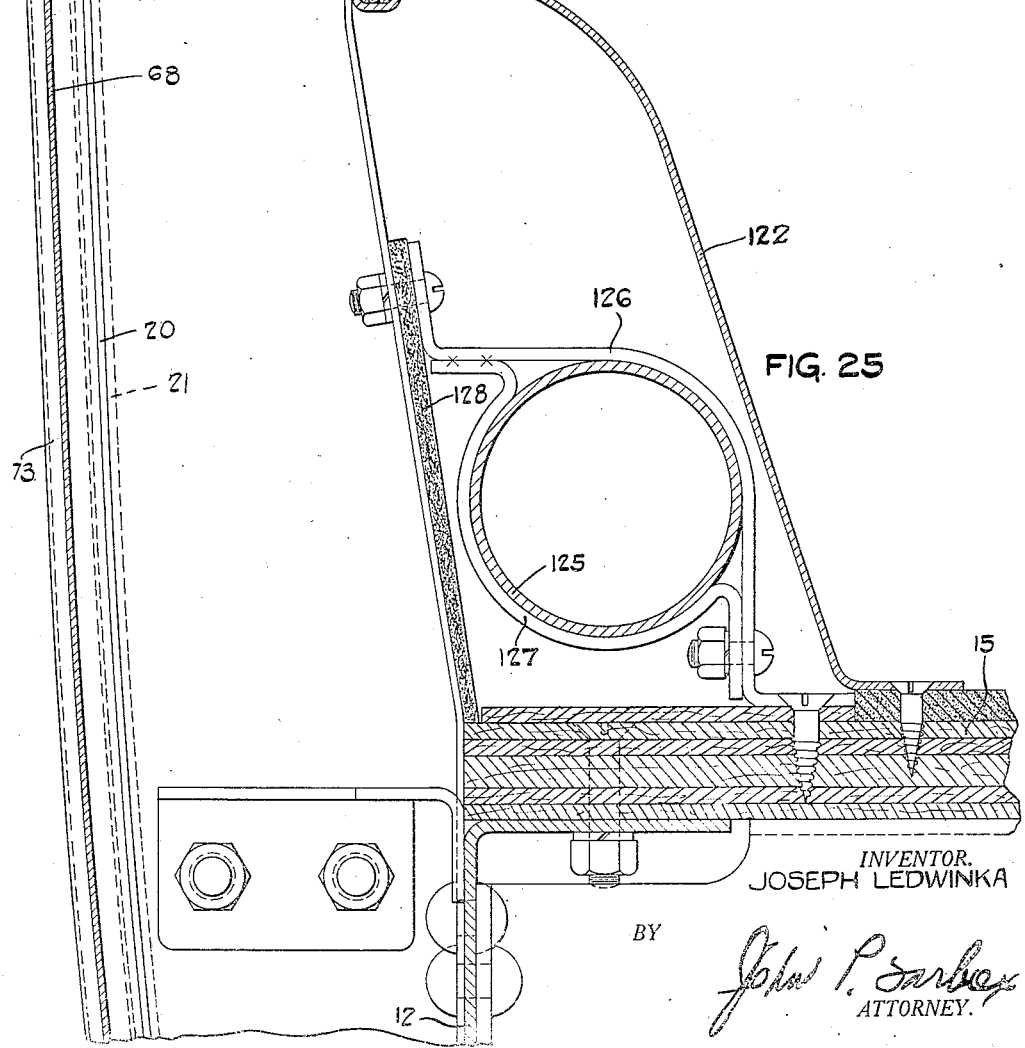

Figs. 23, 24 and 25 are detail sectional views similar to the corersponding portions of Fig. 3 but on a greatly enlarged scale and showing, respectively, the upper end of a post and its joinder with the roof structure, the intermediate or belt line section of a post and the lower portion of a post in the region of the floor of the body.

Figure 26:
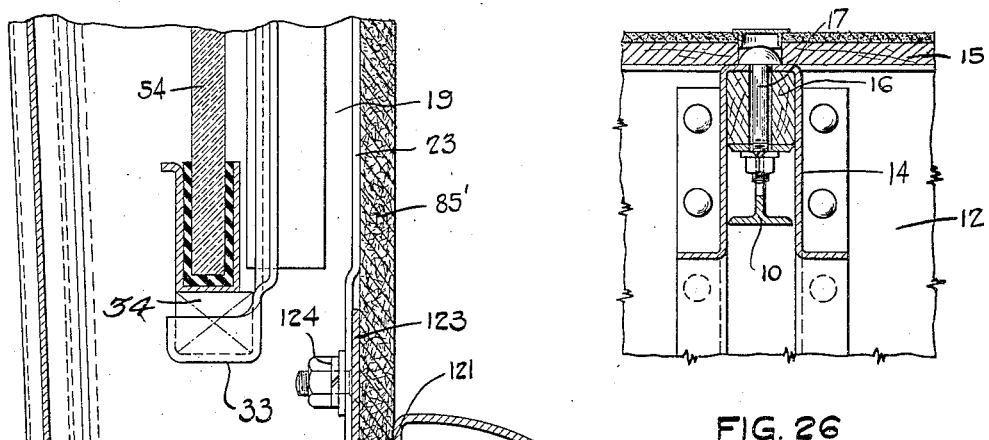

Fig. 26 is a detail sectional view taken on the section line 26—26 of Fig. 3.

Fig. 27 is an inside view in perspective of the top of a front corner post and its joinder to the associated roof and side header structures.

Figs. 28 and 29 are detail sectional views taken, respectively, on the lines 28—28 of Fig. 27 and 29—29 of Fig. 28.

Fig. 30 is a detail sectional view similar to Fig. 23 but on a somewhat smaller scale showing a modified construction at the top of the post where it joins the roof structure.

Fig. 31 is a detail sectional view similar to Fig. 24 showing a slightly modified construction at the belt rail.

Fig. 32 is a detail sectional view taken on the line 32—32 of Fig. 31.

Fig. 33 is a detail sectional view similar to Fig. 3 but on an enlarged scale showing more clearly the construction whereby the bottom edges of the side panels and the fender rail are removably connected to the outboard body sill.

Fig. 34 is a detail sectional view taken on the line 34—34 of Fig. 1.

In the drawings, corresponding parts in the several views are designated by corresponding reference characters and the various sectional views are viewed in the directions as indicated by the arrows at the ends of the section lines.

The bus body forming the subject of the present invention is built directly on the chassis frame comprising the usual longitudinally extending sills S of channel form (See Fig. 3) connected at the rear by a similarly shaped cross member and by other suitable cross members forwardly of said rear cross member and supporting the motor and other organs of an automotive vehicle. To support the sides and rear of the body superstructure the chassis sills S and the rear cross members are provided at spaced intervals with I-shaped outrigger brackets 10 rigidly secured to the outer surface of the webs of the sills and forming cantilever supports. To strongly brace these outrigger brackets 10 and at the same time provide supports for the flooring in the space between the chassis sills, the tops of the pairs of brackets on opposite sides of the vehicle are interconnected by the straps 11, the ends of which may be secured as by riveting to the outrigger brackets some distance outwardly of their connection to the chassis sills.

The lower edge of the body superstructure so spaced laterally from the sides and rear of the chassis sills S and rear cross member structure is provided with a strong outboard sill structure 12 which is of Z section, the web of the Z being a relatively deep web to form a wide bearing surface for the securement of the body posts which are founded on this sill. The outboard sill 12, because of its deep web, may be made of relatively light gauge metal. It extends substantially from the front post on one side of the body to the front post on the opposite side, the longitudinal portions thereof merging at the rear corners by a wide curve into the rear transverse portion.

The only break in the continuity of the Z section of the outrigger sill structure 12 is in the region of the wheel housings, where an arched angle member 13 (Fig. 16) conforming to the curvature of the wheel housing joins the sill sections in front and rear of said housing. It will be understood, of course, that the outrigger sill 12 may, in actual practice, be made of as many stampings as is necessary for its convenient manufacture, but in final assembly it forms a substantially continuous unitary sill structure, as above described.

The body selected for illustration has on each side thereof eight body posts extending from the bottom to the roof structure which will be designated for convenience in the following description by the reference letters A, B, C, D, E, F, G, H, beginning at the front. From the C post rearwardly to the H post, the body is of substantially uniform width, but from the C posts forward the sides taper inwardly to merge into the rear side edges of the hood. A door opening for the entrance and exit of passengers is provided between the B and C posts on the right hand side of the body. At this point the outboard sill is offset inwardly to provide space for a step in line with the lower edge of the body. At the rear, between the G and H posts an emergency door opening is provided as shown in the drawings, on the right hand side of the body, but such a door opening may be and preferably is provided on both sides of the body.

The outboard sill structure 12 is supported from the outriggers 10 by the angle brackets 14, Figs. 3 and 26, which are, as shown in Fig. 26, of a downwardly presenting flanged channel section, the vertical flanged edges of which are secured as by riveting to the web of the Z-section sill 12 and the top of which is in line with the upper flange of the said sill 12, and with the connecting brace 11 between the opposite pairs of outriggers, whereby the flooring 15 is supported on the upper flanges of the sills 12, the tops of brackets 14 and the said braces 11, and may, if desired, be secured as by bolts, to the flanges of the sills.

Between the bottom of the channel of the bracket 14 and the top of the outrigger 10 which is downwardly offset at its outer end, a block of wood 16 may be placed to aid in absorbing the road shock. Brackets 14, wood block 16 and outrigger 10 are secured together by bolts 17.

The posts erected upon the outboard sills 12 and forming the frame members of the sides of the body are generally of inwardly presenting channel form and are comprised of relatively light gauge sheet metal stampings. Strength is provided by the channel section and further by the lateral flanges at the inner edges of the channels and the integrally formed beads or projections forming sides of the glass run channels.

For convenience and economy in manufacture, each of the side frame posts B, C, D, E, F and G, are made of two opposed metal stampings flanged at their outer and inner edges. The D, E, and F posts are each of the form shown in Figs. 4 and 5. These relatively narrow posts form the only opaque elements between the window openings, above the belt line from the C post to the G post. The C and G posts on the left hand side of the body are also of this form.

As shown in Figs. 4 and 5, the post stampings 18 and 19 of the D, E and F posts have, respectively, outer flanges 20 and 21 which are applied to each other in overlapping relation and secured, as by spot welding and form the bottom of the channel of the post. These flanges extend from one end of the post to the other.

The stampings 18 and 19 entering a post structure have below the belt line, respectively, the outturned flanges 22 and 23 against which the interior trim is applied and through which at the bottom the post has an extended bearing for its securement to the sills 12 as by riveting. Above the belt line the post stampings 18, 19, are provided, respectively, with inturned flanges 24 and 25 against which is applied a lighter gauge sheet metal stamping 26 forming the interior trim, curtain guide channel and a portion of the glass run channel. This stamping 26 is generally channel shaped in cross section the sides of the channel being formed with channel depressions or grooves 27, the bases of which lie against the sides of the post. These channels 27 form guides for the curtains with which the window openings are provided.

At their edges the sides of the channel stamping 26 are formed with inturned flanges 28 which form with the outwardly extending beads or projections 29, 30 on the post stampings 18 and 19, respectively, the sides of the glass run channels for the windows at points above the belt line. Below the belt line the glass run channels are provided by the beads 29, 30 and angle members 31, 32, secured, respectively, to the opposite sides of the post. As shown in Fig. 25, window stop stampings 33 each carrying a resilient buffer 34 are secured, as by spot welding, to the lower ends of members 31, 32.

The F post, being over the wheel housing, is foreshortened at its lower end and has its lateral flanges secured as by riveting to the vertical arm of the arched angle member 13 bracing the wheel housing and connecting the fore and aft Z section portions of the sill 12. A horizontally extending angle brace 13' interconnects the lower portions of the F and G posts and the top of the arched member 13 and stiffens and strengthens the entire structure, see Fig. 16.

The C and G posts adjacent to the door openings have one of their two component stampings formed identically with the corresponding stamping of the post structures just described, as will be seen by reference to Figs. 12 and 15 showing the G post on the right hand side of the body. The other of their stampings, in the case of the G post, the stamping 35, being adjacent the door opening has a substantially channel shape throughout its length, the base of the channel forming the jamb face of the door, and the outer side 36 forms a stop shoulder for the door, cooperating to this end with the door overlap 37.

The B post in front of the front door opening is also made of two stampings 38 and 39 shaped above the belt line as shown in Fig. 20. Below the belt line the structure is essentially similar except that the front stamping 38 has inner flange 40 turned forwardly instead of rearwardly as above the belt line. A suitable trim stamping is secured over the open mouth of the channel above the belt line.

The A or front corner post is substantially of triangular box shape in section above the belt line, see Fig. 20, and is comprised of two stampings 41 and 41ª of substantially channel section telescoping within each other and rigidly secured together to form the box section. At its lower end the stamping 41 is flanged outwardly and secured by riveting it to the outboard sill 12 in a manner similar to the manner of securing the remaining posts.

The rear or H post at the rear edge of the emergency door is also of inwardly presenting channel form as shown in Figs. 12 and 14. The forward outer edge of the bottom of the channel is rabbeted at 45 along the door opening to receive the door overlap while the side facing the door is made to conform generally to the shape of the jamb rail of the door, being formed along the lower portion of the door opening with a stop shoulder 46 to cooperate with a similar shoulder on the door rail, see Fig. 14. At the bottom the post is joined to the sill through outturned flanges similar to those on the posts already described.

At the rear of the body, a wide window opening is provided and posts similar generally to the side posts are here erected on the transverse portion of the outboard sill 12. These posts are in the present instance, three in number, one erected at each side of the window opening and extending from the bottom of the body to the roof and another erected at the center extending from the bottom to the window. From right to left the rear posts are designated, respectively, J, K, and L.

The two lateral posts, J and L flanking the window opening, are as shown in Fig. 9, of channel section, the channels presenting laterally and they are curved longitudinally similarly to the side posts to conform to the smoothly flowing and graceful body lines. At the bottom their inner side walls extend vertically and are securely riveted to the deep vertical web of the outboard sill structure 12. The short central post K is of inwardly presenting channel form and is secured to the sill, see Fig. 8, in a similar manner to the side posts. At the top it is dubbed off and has side walls turned laterally to form tabs 47, Fig. 7 which are secured to the window sill, as will presently be described.

At the top the body side posts extend some distance above the window and door openings and are joined by a longitudinally extending header rail 48 of substantially Z shape in section having its web applied to the inner surface of the posts and secured to the laterally outwardly extending flanges thereof, as by riveting. The upper arm of the Z-shaped rail extends across the top of the posts and the lower arm extends inwardly of the body, see Figs. 3 and 23. This header rail may extend, and preferably does extend, from the B post to the rear side or H post, and may be an integral stamping or made of several stampings secured to each other in longitudinal series.

On the outside, the posts are further secured at the top by the longitudinally extending peak panel or letter board 49 which may comprise a stamping of substantially inwardly presenting channel form the upper wall of the channel being flanged laterally at 50, this flange being rigidly secured as by riveting to the outer flanges of the post stampings. In this upper region the outside surface of the posts incline upwardly and inwardly to accommodate them to the curve of the roof paneling which comes down some distance over the outside of the posts and is secured thereto, as will presently be described. Above the window openings, from the main door rearwardly on the right hand side, and from the B post rearwardly on the left hand side of the body, the lower wall of the channel peak panel 49 is extended inwardly between adjacent posts, as shown most clearly in Fig. 23, and has formed in the outer portion of said inward extension a channel 51 to receive the upper edge of a fixed narrow glass strip 51′ arranged outside the movable window glass, such as is in some instances provided on vehicle bodies to permit a slight lowering of the window in inclement weather, without having the rain, snow or wind drive in. Stampings 51″, see Fig. 23, are secured to the outside of the posts and coact with the channels 51 to hold the glass strips 51′ in place.

Inwardly of said channel 51 the inward extension of the panel 49 is extended upwardly and then inwardly at 52, 53 to form the outside and bottom of the channel for receiving the upper edge of the window 54 when in raised position. The portion 53 ends in vertical alignment with the outer wall of the curtain guiding channel 27 of the moulding stamping 26, and is flanged upwardly along its edge as at 54′. A channel 53′ carrying weather stripping is secured to the portion 53 and forms the inner finish at the top of a window and the inner wall of the window receiving channel.

The inward extensions of panel 49 are secured to the sides of the posts by angle brackets, as 55, having one arm thereof secured as by welding to the portions 53 of the panel and the other arm bolted or otherwise secured to the posts.

The panels 49 extend continuously from the A posts to the H post and may be made in one integral stamping or in several stampings secured together by a butt joint or otherwise so as to make the joint invisible on the outside after the finish is applied.

Above the door openings the header panel 49 is vertically fore shortened and its lower portion is shaped as shown in Fig. 11 to accommodate it to the shape of the upper door rail, being provided with a rabbet 56 to receive the door overlap 37 and a horizontal inward extension 57 of the width of the door which is flanged upwardly at 58 along its inner edge. Above the front door opening the formation is similar and so is the formation above the window openings between the A and B posts.

To further strengthen the side framework of the body, it is provided substantially along the belt line with a relatively heavy gauge belt rail 59 of angle shape, as shown in Fig. 24, which is rigidly secured as by riveting, to an inwardly offset portion of the outer portion of the body side posts and extends on the right hand side of the body from the C post to the H post. On the left hand side of the body which is unbroken by a door opening at the forward end, the belt rail is extended to the B post.

Below the line of the window openings, between the doorway openings on the right hand side and from the rear doorway opening, if such an opening is provided, or from the H post if no doorway opening is provided to the B post on the left hand side, the outer paneling is for the most part removably applied, so that it can be readily replaced in case of injury. At the top, however, just below the window opening, a fixed belt panel 60 of the cross sectional contour clearly shown in Fig. 24 is applied to the posts. This belt panel extends from doorway to doorway on the right hand side and from rear doorway or from the H post if no doorway on that side to the B post on the left hand side of the body. At the top it is turned in to form the inclined outer portion of the window sills at 61, this inturned portion being bent back upon itself at 62 and then flanged downwardly at 63. It is secured to the posts at the top by gas welding the edges thereof adjacent the posts to the posts. At the bottom it is formed with an inwardly presenting channel section portion 64 having an upwardly extending flange 65 through which it is removably secured to the belt rail 59. To this end, a reinforcing strip 66 is secured to the outside surface of the flange 65, which is tapped at suitable intervals to receive the securing bolts 67. By this construction, the securing means are readily and completely hidden from the outside.

From this belt panel 60 to the bottom of the body, the paneling is made in sections 68 extending between adjacent posts and since the posts are equally spaced apart, these panel sections, except in the region of the wheel housing, are of a standard form and dimension. At the top, the sections are inwardly offset, as shown at 69, the inwardly offset portion 70 being inserted between the flange 65 of the belt panel 60 and the belt rail 59. All of these parts are secured together by the bolts 67.

Along their vertical edges at the posts, the panels are offset inwardly at 72 so that the bodies thereof are spaced from the belt rail 70 and the offset edges of adjacent panel sections 68 rest against the posts and together form a depression in the outer paneling at the post line. The depression is covered by a moulding strip stamping 73 overlapping the adjacent edges of the panels and secured to the posts by bolts 74 and nuts 75 thereby clamping the edges of the panels to the posts. Above the belt line the outside surface of the posts is finished by a similar moulding 76 secured similarly by bolts 74 and nuts 75. In each case, the moulding is so shaped as to hide the heads of the bolts by enclosing the same.

At the bottom, the panel sections 68 are formed with an inwardly extending flange 77 which laps under and is secured to the outturned flange at the bottom of the outboard sills 12. This connection is effected by bolts 78 as clearly indicated in Fig. 33. A fender rail 79 extending outwardly beyond the bottom edge of the paneling is secured to the outrigger sills by the same securing bolts 78. This fender is strengthened and stiffened by being formed along its outer edge to provide an inwardly presenting channel cross section.

The fender along the bottom edge of the sides of the body finds its counterpart in the wheel housing region in an angle member 80, Fig. 17, curved to conform to the wheel housing brace 13. The wheel housing panel 81 has a portion of its inner edge flanged laterally at 81' and lying on the adjacent chassis sill S. Its outer edge 81" lies directly against the outwardly extending arm of the angle brace 13, while the adjacent side panel sections have their lower edge flanges 77 lying under the edge of the wheel housing panel and the angle shaped fender 80 has its inwardly extending arm in turn lying under the inturned panel flanges 77, these four thicknesses of metal being joined together by the bolts 82. The outer downwardly extending arm of the wheel house fender 80 is beaded along its edge for strengthening and stiffening purposes as well as to improve its appearance.

On the inside, the side posts C to G on the right hand side of the body and the posts B to G on the left hand side are further joined by an inner belt rail 83 of substantially outwardly presenting channel section, the channel rail 83 being applied to the posts with its vertically deepened web seated in an offset provided on the inner surface of the posts and secured thereto as by riveting. The sides of the channel are, of course, cut away at the posts to allow the web to lie flat against the posts. To the upper flange of this rail 83 are removably secured as by bolts 84 the lower inside window moulding stampings 85, the outer edges of which are spaced from the inturned sill portions 61, 62 of the belt panel 60 a distance sufficient to permit the window to move vertically between them. On the inside the moulding stamping 85 is formed with a downwardly open recess to receive the upper edge of the flat panels of upholstery 85'. These panels correspond in number and size to the outside panels 68 and are secured in place by the same bolting means which secure the outer paneling. As shown in Fig. 5, the adjacent vertical edges of the upholstery panels are covered by a trim strip 86 through which extend the elongated nuts 87, which screw onto the ends of the bolts 74 and thereby clamp the upholstery panels in place. Similarly, above the belt line, nuts 87 secure the moulding stamping 26 in place.

Around the rear of the body, where the body is protected against injury by minor collisions by the bumper 88, and the necessity for replacement of paneling on account of damage through collision is not therefor so liable to arise, the paneling has been shown in this illustrative embodiment of the invention as permanently applied to the frame as by riveting or welding.

Below the rear door opening, which ends at the bottom adjacent the top of the outboard sill 12, a panel member 89 is provided which is flanged inwardly at bottom, rear side and top and forms with the sill and door posts a hollow box structure. Its bottom flange is joined to the lower arm of the sill as by riveting, see Fig. 11. Its top flange forms the threshold of the door, is provided with a rabbet 91 to receive the door overlap, and has a downwardly offset inner portion 90, which is riveted to the top arm of the sill. The rear vertical edge flange of this panel member is secured to the H post. The forward vertical edge is secured through moulding strip 73 to the G post. Where the edges of the threshold portion abut the posts, they are joined thereto by gas welding.

At the rear of the body, upper and lower channel shaped headers 92 and 93 define the upper and lower edges of the rear window opening and are curved at the rear corners of the body on a wide curve, their ends being extended forwardly to the H posts, and secured thereto. The header 92 is an upwardly presenting channel secured by its bottom to the tops of the rear posts J and L, while the header or inner belt rail 93 is an outwardly presenting channel and corresponds to the channel member 83 connecting side posts and is correspondingly secured to the posts J and L. At the central dubbed off rear post K, the upper flange of the belt rail 93 is secured directly to the lateral tabs 47 at the top of the post as by welding. The ends of the headers 92 and 93 may be secured to the H posts by brackets (not shown) similar to the brackets 55 hereinbefore referred to.

The rear paneling, as shown, is made in three sections, the two side sections 95 and 96 of quarter round section extending around the rear corners, and the central section 97 below the window opening. The side sections are secured to the H posts by having their vertical edges nested within the rabbet 45, Figs. 12 and 14, of the posts and spot welded thereto. The upper edges are flanged inwardly as at 98, Fig. 22, and secured to the bottom of the header 92 as by bolting or riveting. At the bottom, they are flanged inwardly as are the side panel sections 68 and secured to the lower arm of the Z section sill, either by riveting, bolting or welding. At their edges adjacent the J and L posts, they are flanged inwardly, as at 99, Fig. 9, and secured to the bottoms of the channels of the posts as by riveting or welding. The central panel 97 below the window opening is similarly flanged inwardly at bottom, sides and top and secured, respectively, to the sill 12, J and L posts and header 93, see Figs. 7, 8, 9 and 10. A rectangular sheet metal structure 100 flanged around its outer edge at 101 forms the window frame and finish fitting within the opening formed by the posts J and L and upper and lower headers 92 and 93 and the paneling flanged inwardly around the window opening. This member is removably locked in place by the bolts, 94, which serve also to secure the paneling to the headers and posts.

In front of the B posts, the side paneling is secured to the A and B posts in any suitable manner, and extends forwardly to the forward edge of the cowl. A transverse panel 102 forms the top of the cowl and is secured to the side panels and A posts, as by welding or otherwise. The rear edge of this panel 102 is turned upwardly and then rearwardly at 103 and is secured to the transverse angle section frame member 104 connecting the A posts below the windshield opening as by bolts. The frame member 104 may be secured to the A posts by means of the upturned tabs 105, Fig. 21.

At the top the A posts are transversely connected by the bowed strap 106 which forms a support for the forward portion of the roof and provides the upper frame member of a ventilating opening or openings arranged above the windshield frame proper, as will presently be described. The strap 106 overlaps the inner sides of the tops of the A posts as far down as the top of the windshield opening proper, and is secured thereto as by welding or riveting.

The roof structure comprises a plurality of transversely extending arched frame members 107 extending between the upper edges of the body sides, the foremost one being arranged substantially in the plane of the B posts and the rearmost one in the plane of the H posts. Between these are arranged such number of these frame members as are found necessary to properly support the roof and interbrace the sides of the body. As shown in Fig. 6, these arched roof frame members are of substantially inverted channel shape in cross section flanged laterally at their edges and are secured at their ends, Figs. 3, as by spot welding, to brackets 108 correspondingly shaped in cross section, but having vertically extending arms 109 secured as by riveting to the vertical web of the header rail 48. These frame members are, throughout that portion of the body of equal width, of the same form and dimensions. The roof paneling is preferably also made in panel sections 110 which are for the most part of standard form and dimension, these panel sections being secured to each other in overlapping relation as by riveting and to the arched transverse frame members 107 also by riveting. In order to make a roof structure as light as possible the roof panel sections may be made of sheet aluminum.

At the sides, the roof panel sections 110 are continued down and curved inwardly outside the inwardly inclined outer surfaces of the posts and secured along their edges to the laterally extended flange 50 of the peak panel 49 as by riveting. At the posts, the peak panel and the roof panels are all secured together by rivets extending through all these elements. A pressed metal drip channel 111 is seated in the angle formed by the upper side of the channeled peak panel 49 and the flange 50. The edges of the roof panel sections extend into this channel, the drip channel being secured to the edges of the roof panels, in the present instance by the same set of rivets that secure the roof panels to the header.

The rear roof panel section arches down from the rear transverse roof frame member 107 in curved lines corresponding to the sides of the roof forwardly of the H posts and has its lower edge which is curved to correspond to the curvature of the upper header 92 flanged inwardly as at 112 and secured to the bottom of the header, as by riveting or bolting, as shown, in Figs. 7 and 22.

At the front, the foremost roof panel section 110 is supported at the A posts by having its edge secured to the outside of the A posts in the manner already described. Inwardly of the A posts it rests upon the bowed strap 106 at a point adjacent the A posts, and centrally between the A posts it rests upon a channel stamping 113 located between the strap 106 and the roof panel section and having its channel presenting rearwardly. The channel stamping 113 has its sides connected, respectively, to the panel section and to the strap member, as shown, by bolting the parts together. A sign box structure 114 has its rear edge secured to the stamping 113 by said bolts. The drip channel 111 extends around the front of the roof section which projects forwardly of the A posts to form a visor and is reinforced by a channel section stamping 114 having its rear side flanged laterally. This reinforcing member extends from side to side of the visor and has its ends conform to and abut the curved side portions of the drip channel, in this way reinforcing the drip channel to which the edge of the roof panel 110 and the forward edge of the sign box structure are secured, see Figs. 27 and 28. Stampings 114' are secured to the front posts and drip channel and form the sides of the visor. The visor reinforcing member 114 also serves to mount the crank 115 for turning the sign rollers (not shown).

At the rear of the body, above the window opening, there is secured a transversely extending metal drip channel secured to the header 92, as by riveting.

From the foregoing description, it will be seen that the body posts, the side panels, the transverse roof frame members, and the roof panels are in large part made of standard form and dimensions, thus reducing the number of dies necessary to make these parts, and so lowering die cost, cutting down the number of operations and saving in floor space and in the cost of labor, thereby very materially cutting down the cost of production. Also the side panels sections and fenders along the lower edge of the body are made readily detachable, thereby permitting quick repairs to be made to them in case of injury, and thus contributing toward keeping the vehicles equipped with the improved body continually in service, thereby lowering the operating costs.

The construction hereinbefore described also lends itself very readily to the application of the interior upholstery and trim. Already it has been pointed out how the side upholstery panels are made in sections corresponding to the removable outside panel sections and that these are held in place by common securing means namely, the bolts 74. At the rear of the body the upholstery may likewise be readily applied as indicated in Figs. 7 and 9 to the interior surfaces of the posts H, J, K, L and the upper and lower headers 92 and 93, and secured by screws or other fastening means (not shown). For the attachment of the roof upholstery, wooden tacking strips 116, Figs. 3 and 23, at the sides and 117 at the rear, Fig. 7, are nested, respectively, within the angle of the header rail 48 and within the angle of the header 92. Furthermore, wooden strips 118 (Figs. 3 and 6) are secured as by screws to the transverse roof frame members 107 to which the upholstery is applied and secured by the outer strips 119 and screws 120.

As already described, the upper edges of the side upholstery panels 85′ are received within a downwardly open channel or recess formed in the window moulding 85. Similarly, the lower edges of these flat panels 85″ are received within grooves 121 formed in the upper portions of the heater pipe covers 122, which preferably comprise sheet metal stampings having their lower edges flanged and secured to the flooring and having their main body portions extending upwardly and outwardly, (see Fig. 25), and curved toward the posts on a wide curve where they are formed with the above-mentioned grooves to receive the edges of the upholstery units and flanged upwardly at their edges as at 123, these flanges being secured to the posts by bolts 124. These heater pipe covers are perforated at suitable intervals to allow the heated air surrounding the pipes 125, through which the hot exhaust gases pass, to pass into the interior of the body. Any suitable arrangement may be provided to cause the air to circulate over the heater pipes. These pipes themselves are supported in the angles formed between the body side posts and the flooring 15 by metal clamping straps 126, 127. The strap 126 is laterally flanged at its ends and secured to the flooring and posts, respectively, while the other strap 127 has one end welded to strap 126 adjacent one end thereof and its other end secured by a bolt adjacent the other end of strap 26. The tightening of the bolt clamps the members 26, 27 into gripping engagement with the pipe 125. A strip of insulating material 128 may be applied to the inside of the posts between them and the heating pipe. Similar insulation may, if desired, be placed over the flooring adjacent the pipe 125.

By the arrangement of movable windows provided in this improved bus body, the interior may be ventilated to suit widely varying conditions. It will be noted that the windows 129 between the A and B posts are hinged to the A post to permit them to be swung outwardly some distance. Similarly the rear window 130 is hinged to the top member of the frame 100 whereby it can be swung rearwardly, and right and left ventilator windows 131 fitting the space between the windshield frame proper 132 and the strap 106, of the roof structure and hinged to the upper transverse portion of said windshield frame can be swung rearwardly to admit air at the front just under the roof. Obviously, the windows at the sides may be lowered into the space between the outside and the upholstery panels any suitable regulating means being provided for this purpose. Such regulating means as R may be arranged between the posts and above the inwardly extending lower side of the peak panel 49, and forms no necessary part of this invention and will not, therefore, be more fully described herein.

The curtain rollers, not shown and their brackets 133 suitably secured to the body side posts are also arranged above the plane of the inwardly extending lower side of the header and all of these parts, curtain supports and window regulating means are neatly inclosed so as to be entirely hidden from view from the interior of the body by the sectional finishing panels 134 which overlap the edge of the roof upholstery at the top and are secured to the tacking strip 116 as by screws. Their lower portions are quarter round in cross section and the lower edge thereof extends substantially horizontally in the plane of the inwardly extending lower side of the peak panel 49 and is spaced therefrom but a slight distance. The lower edge is beaded to form a smooth surface around which the curtain may pass.

These finishing panels 134 extend from the front door opening on the right hand side back to the G post and on the left hand side from the B post to the G post, each section being of a length to extend between two posts and overlapping the adjacent section. Thus it will be seen that, all of these sections may be made of a standard form and dimension.

The windshield frame proper comprises a four sided frame 135 of pressed sheet metal, the bottom and sides of which, see Figs. 20 and 21, are substantially of Z section, the inner arm of the Z being bent back upon itself. The top of the frame is of substantial angle section such as could be obtained by bending back upon the main web the outer arm of a section similar to the Z of the side and bottom members. The frame so constituted is set in between the A posts from the front and when in place the outer arms of the Z section sides and bottom overlap a slight distance, respectively, the front side of the A posts and the downwardly extending arm of the transverse angle member 104, the cowl panel 102 being clamped between the angle member and the outer arm of the bottom windshield frame member. So positioned, it is secured in place by any suitable means, such as screws, (not shown).

To provide for a clear windshield in cold. frosty weather, when front is liable to form on the inside of the glass and ice or snow to collect on the outside, the windshield frame is provided with an inner and an outer glass as 136 and 137, with a space therebetween for the circulation of warm air. In the present embodiment of the invention each of the glasses is provided with a permanently attached sash of pressed metal and one of said sashes is fixedly mounted in the windshield frame while the other is movably mounted. As shown, the inner glass is secured by screws to the inner bent back arms of the Z section frame. Incidentally, these screws also serve at the bottom to secure in place the instrument board panel 138 which hooks over the top edge of the arm of the Z. The outer glass is hinged at the top to the outer portion of the angle section top member of the frame. Suitable means, (not shown), are provided to hold it in closed position. This movable mounting of the outer glass permits ready access to the adjacent surfaces of the two glasses for cleaning. To provide for a constant circulation of hot air between the window glasses 136, 137, transverse rows of perforations 139, 140 are provided, respectively, in the bottom and top frame members of the windshield and a heating pipe 141 is placed transversely under the lower frame member. In this way air surrounding the pipe being heated will rise through perforations 139, pass upwardly between the glasses 136, 137 and warm the outer glass above the freezing point and pass out into the inside of the body of the bus through perforations 140. The rising heated air will continually draw colder air from below so that a continuous circulation is set up and the windshield is kept substantially clear at all times.

It will be understood, of course, that suitable weatherstripping, as indicated by reference numeral 142 in Figs. 7, 9, 20, 21, 24 is applied at the window and door openings where required.

In Figs. 31 and 32, there is shown a slightly modified construction which is perhaps to be preferred because it strengthens the framework at the sides and enables the use of side panel sections 68' which are flat along their edges and thus permits the use of simpler dies for forming the panels, and a simpler moulding strip along the edges of the panels. The belt rail 59' of this modified form is strengthened very materially by being formed, instead of a simple angle section, of a channel section, the wide web of the channel being further stiffened by the formation therein of an outwardly extending channel section bead 143. The rivet heads securing the web of the rail 59' to the posts fit within countersunk holes so that they are flush with the outer surface of the rail. This permits the panel sections 68' to lie flat against the web of the rail, and they are, therefore, made flat along their edges, and secured in position by the bolts as 74 and the moulding strip 73' of simple section (arched outer portion and flat base) resting against the adjacent panel section edges and covering the heads of the bolts. Thus it will be seen that this modified construction adds strength to the framework and at the same time simplifies the construction of the removable panel sections 68' and the securing means therefor.

In Fig. 30 there is indicated a modified construction at the top of the body side posts, which may be used in some cases and which provides a somewhat simplified arrangement of parts in this region, by lessening the number of parts and facilitating their joinder.

According to this form of the invention, the body side posts are fore-shortened at their upper ends and the header rail 48' is of substantially downwardly presenting channel section seated on the tops of the posts, the sides of the channel being secured as by riveting to the front and rear sides of the posts. The inner side of the channel is provided along its edge with a stiffening flange 144 and the outer side of the channel is flanged laterally at 145 and then upwardly at 146 to form the drip channel integrally therewith. The outer side wall of the channel and the base 145 of the drip channel nest within the angle formed by the upper wall of the channel shaped peak panel 49 and the lateral flange 50 thereon, which may be secured to the posts by the same securing rivets as those securing the outer wall of the inverted channel header rail 48'. The peak panel 49 is essentially similar to the peak panel in the form hereinbefore described and has, therefore, been designated by the same reference characters. The roof paneling is secured in the same manner as in the hereinbefore described construction by extending its edge down into the drip channel and riveting it to the posts, the header rail and peak panel flange 50. The channel section bracket 108' for connecting the transverse roof supporting frame members 107' to the header rail and posts has its side walls flanged laterally at 147 and secured to the bottom of the header rail 48' by riveting through said lateral flanges. The outer flanged side walls of this bracket are curved to form with the outside wall of the inverted channel header rail 48' and the end of the transverse frame member 107' secured thereto, a continuous, smooth, curved surface upon which the roof paneling 110 is supported.

Instead of forming the post stampings 18 and 19 at the top with laterally outwardly extending flanges formed integrally therewith, in this modified construction, the bracket 55' for securing the lower inwardly extending wall of the peak panel 49 is extended upwardly to the top of the post and is provided with a flange 148 to which the inner wall of the inverted channel header rail 48' is secured. Since the bracket 55 is welded to a side stamping of the post, it is in effect an integral part of the post but by using this bracket for the purpose of securing the header to the post, the post stamping is somewhat simplified. The bracket 55' is further made use of to secure the adjacent interior trim stamping 134'. To this end bracket 55' is extended inwardly in its lower portion somewhat beyond the inner surface of the post and is there provided with a lateral tab 149 to which the trim stamping is removably secured by screws or bolts 150. The trim stamping 134' is flanged inwardly between the posts as at 151, and the inner edge of the flange is turned upwardly and forms the inner wall of the channel for receiving the upper edge of the raised window. It will be seen that, by this construction, the extra moulding strip provided for this purpose and shown in Fig. 23 is dispensed with. This is made possible partly by the fact that, in this modified construction, the curtain supports are not arranged so as to be hidden by the moulding stampings 134'. The stamping 134' extends upwardly and lies against the roof supporting bracket 108' being formed with an inwardly extending bead 152 along its edge under which edge of the upholstery covering the roof framework may be clamped. The upholstery may, in this case, be secured directly to the roof by drive screws instead of by the use of the usual wooden strips.

The emergency door structure shown in Figs. 11, 12, 13, 14 and 15 is substantially similar to that disclosed and claimed in my copending application, Serial No. 80,797, filed January 12, 1926, door construction, except that the window in this case is fixed and the outer paneling 153 is consequently extended inwardly at the bottom of the window opening and secured to the outwardly extending flanges 154 of the inner panel 155. At the bottom, the door structure differs from that in the above identified application in that it is provided with the usual door overlap 37. The front door, the hinge rail 156 of which is shown in section in Fig. 20, may be of the construction disclosed and claimed in copending application, Serial No. 160,867, filed January 13, 1927, automobile door construction, or any other suitable all metal construction.

A spare wheel carrier bracket is arranged between the A and B posts as represented in Fig. 19. In this figure only one of the two stampings comprising the posts is shown. This bracket comprised a channel section pressed metal brace 157 the channel presenting inwardly and being provided with lateral flanges, as 158, which are riveted to the flange 159 of the A post and to an angle member 160 welded to the B post. The side walls of the channel brace are further secured to the A and B posts by being formed with lateral tabs as 161, riveted to the webs 162 and 163, respectively, of the post stampings. To the base of this channel brace is secured a perforated boss having an annular flange thereon oblique to the axis of the boss which is secured as by riveting to the bottom of the channel brace 157, the outer portion of the boss projecting through a hole 158' in the said bottom of the channel brace. A wheel securing bolt 159 passes through the hole in the boss, as shown.

While a specific embodiment of the invention has been described herein, it will be understood that modifications and alterations may be made without departing from the generic spirit of the invention. Such modifications and alterations are to be comprehended within the scope of the appended claims.

What I claim as new and useful is:

1. In a vehicle body, a body post of inwardly presenting channel form constituting substantially the entire strength-giving portion of the post structure, the sides of said channel being formed as separate stampings having lateral flanges which are secured in overlapping relation to form the base of the channel and lateral projections presenting in a direction opposite to said flanges and forming parts of glass run channels.

2. In a vehicle body, a body underframe comprising chassis sills, outrigger brackets secured thereto, an outboard sill structure, inwardly extending brackets secured thereto and each having a portion adapted to overlie a portion of the outrigger brackets, a shock diffusing block disposed between said overlying portions of the brackets, and means securing said brackets and block together.

3. In a vehicle body, a body underframe comprising chassis sills, outriggers secured thereto, an outboard sill structure having a relatively deep vertical web portion, brackets of inverted channel section having their outer portions of a depth substantially corresponding to the depth of said web portion and secured thereto, said brackets and outriggers being telescopically disposed and secured together.

4. In a vehicle body, an outboard sill of angle section and having a deep vertical web for the attachment of body posts and an outwardly extending flange at its lower edge, body paneling flanged at the bottom and having the flange thereof secured to the flange of the sill, and a fender associated with said sill flange and having its outer portion projecting some distance beyond the lower edge of the body.

5. In a vehicle body, an outboard sill of angle section having a deep vertical body web for the attachment of body posts and an outwardly extending flange at its lower edge, outer paneling and a fender rail removably secured to said flange, and means commonly securing said paneling and fender rail to said sill flange.

6. In a vehicle body, body side posts, a peak panel having its main body of inwardly presenting channel form having its upper side wall flanged substantially vertically and secured to the posts and its bottom side wall extended inwardly between the posts and secured thereto.

7. In a vehicle body, body side posts, a peak panel of inwardly presenting channel form having its upper side wall flanged to form therewith an upwardly and outwardly facing angle, and a drip channel nested within the angle so formed.

8. In a vehicle body, body side posts, a peak panel flanged along its upper edge and applied to said posts through said flanged edge portions, a drip channel having a side wall overlapping said flange, and a roof panel having its lower edge also overlapping said flange, and means commonly securing said panels and drip channel to said posts.

9. In a vehicle body, body posts, a peak panel applied to the outside of said posts and having a portion extending inwardly between adjacent posts and cooperating with a stamping secured to said posts to form the support for a fixed strip of glass arranged at the outside upper portion of the window opening between said posts.

10. In a vehicle body, body side posts, an outer belt rail of angular form connecting said posts, said belt rail having a relatively wide body or web portion secured directly to said posts and formed intermediate its edges with an outwardly extending rib of channel section.

11. In a vehicle body, a Z section sill having its web arranged substantially vertical and outer paneling applied to said sill with its lower edge flanged inwardly and secured to the lower arm of the Z section sill and its upper edge flanged inwardly to form the threshold of a door and secured to the upper arm of the sill.

12. In a vehicle body, having a rear window opening, a frame member of channel form arranged at a side of said window opening and having its channel presenting away from said opening, outer paneling having its main body extending in the direction of the outer side of said channel and its edge flanged inwardly to lie against the bottom of said channel and a window frame element placed against said flange, and means for securing said parts together.

13. In a vehicle body, a pressed metal frame member of channel form having the channel presenting in the general direction of the body wall at that point, an outer panel the body of which lies against the outer side of the channel and is formed with a flange along its edge lying against the bottom of the channel, and another panel, the body of which forms a continuation of the body of the first named panel also formed with a flange along its edge abutting the flange of the first named panel, and means for securing said flanges and frame member together.

14. In a vehicle body, a body side having a window opening therein, a body post of hollow form terminating at the bottom of said window opening and having a lateral tab, and a belt rail of angle form having its body web secured to the inside of said post and being formed at the top with an inwardly extending flange secured to the tab of said post.

15. In a vehicle body, front posts, side peak panels terminating at said front posts, a drip channel supported by said peak panels at the sides and extended forwardly of said front posts and around the front edge of the roof and a transverse reinforcing member secured to the front of said channel and interbracing the sides thereof forwardly of said posts.

16. In a vehicle body, spaced body posts forming the sides of window openings in the upper regions thereof, windows slidable up and down between said posts, an outer one piece peak panel stamping connecting said posts at the top and extended inwardly between the posts and forming the upper limit of movement of said windows and a one piece removable trim stamping bridging said posts at the top opposite said peak panel and forming therewith an enclosure for housing window or curtain raising mechanism.

17. In a closed vehicle body, a plurality of posts, a longitudinally extending header connecting the tops of said posts, roof supports attached to said header, upholstery applied to said roof supports, and an interior finishing trim stamping applied to and secured to said posts with its upper edge overlapping the edge of the roof upholstery and its lower edge extended outwardly between the adjacent posts and forming the upper inside finish of the window opening between said posts.

18. In a vehicle body, a side sill structure embodying an arched over angle section portion in the region of the wheel housing, body posts secured to said structure forwardly and rearwardly of the top of said wheel housing portion, and a brace joining said posts and the top of said wheel housing portion.

19. In a pressed metal vehicle body, chassis side sills, an outboard sill structure supported from said chassis sills, and embodying in the wheel housing region an arched portion, and a wheel housing paneling having its outer edge conforming to and secured to said arched portion and supported along its inner edge by the adjacent chassis sill.

20. In a vehicle body, a pressed metal body post of inwardly presenting channel cross-section, outer paneling applied to the outside of the post, inner paneling applied to the inside of the post, and means for independently, removably securing said outer and inner paneling to the post including a member common to said independent securing means and a pair of elements cooperating with said member.

21. In a vehicle body, a body side having a window opening therein, a body post terminating at the bottom of said window opening, and a belt rail of angular form having its body web secured to the inside of said post and being formed at the top with an outwardly extending flange overlying said post and secured thereto.

22. A sheet metal stamping adapted to form one half of a body post construction for vehicles comprising a main body web pressed out to form a portion of a glass run channel, the edges of said web portion being laterally flanged, the flange at the inner edge of the web being extended in opposite directions above and below the belt.

23. In a vehicle body construction, a belt panel having its upper edge extended inwardly between body posts to form the outer portions of window sills and having its lower edge reversely bent to form a channel masking the securing means, and removable lower body panel sections secured under the reverse bent portion of the belt panel.

24. In a vehicle body, a pressed metal post of inwardly presenting channel cross section of a depth substantially equal to the thickness of the body wall, and having a shoulder formed integrally with the side wall of the post and providing the outer side wall of a glass run channel, and a transverse portion extending from said shoulder forming the bottom of said glass run channel, and a sheet metal stamping providing trim for the open mouth of the channel post and provided with a channel forming the curtain guide and having a shoulder forming the inner wall of said glass run channel.

25. In a vehicle body, a pressed metal body post of inwardly presenting channel cross section, outer paneling applied to its outer face, inner paneling applied to its inner face, and means for removably securing both the outer and inner paneling to said post comprising a common screw-threaded member and a pair of screw-threaded elements cooperating with said member, one of said elements associated with each of said panels for securing it to the post independently of the other.

26. In a vehicle body, an under frame comprising spaced chassis sills, outrigger brackets secured to the outer sides of said sills, and an outboard sill structure having a relatively deep vertical body web supported from said outrigger brackets and extended downwardly a substantial distance below the bottoms of the chassis sills, said web being reinforced by hollow section inwardly extending brackets of substantially the depth of the web where they are secured thereto, said hollow section brackets overlapping the outrigger brackets and supporting the outboard sill structure therefrom.

In testimony whereof he hereunto affixes his signature.

JOSEPH LEDWINKA.